April 24, 1956 L. DE FOREST 2,743,318

METHOD AND APPARATUS FOR RECORDING AND REPRODUCING TELEVISION PICTURES

Filed April 13, 1953

INVENTOR.
LEE DE FOREST

BY Fulwider, Mattingly & Babcock
Attorneys

United States Patent Office 2,743,318

Patented Apr. 24, 1956

2,743,318

METHOD AND APPARATUS FOR RECORDING AND REPRODUCING TELEVISION PICTURES

Lee de Forest, Los Angeles, Calif.

Application April 13, 1953, Serial No. 348,464

11 Claims. (Cl. 179—100.2)

My invention relates generally to methods and apparatus for recording and storing television pictures, and for reproducing such pictures from these records.

It has long been recognized as desirable to record and store television programs in the same general manner that radio programs have been recorded and then reproduced at some later time. However, the problem of recording and reproducing a television program is made quite difficult by the fact that the frequencies involved in television work are very much higher than those involved in audio recording and reproducing. For example, the American standard television image consists of 525 horizontal lines, and such an image, denoted as a frame, is repeated 30 times per second. Thus, the lines alone occur at the frequency of 15,750 lines per second, a value that is rarely encountered in the recording and reproduction of audio signals, since it is near or beyond the range of hearing for most individuals. When it is further realized that each line is, or may be, further broken into a number of smaller elements or dots, it quickly becomes apparent that television programs are concerned with frequencies in the order of megacycles.

With the exception of photosensitive materials, such as film, the usual recording mediums, operated at the usual recording speed, are not capable of recording such high frequencies. Mechanically grooved records, such as phonograph records, clearly cannot record such programs, and heretofore no practical method of magnetically recording on wire or tape has been proposed.

Attempts have heretofore been made to record television programs magnetically by moving a tape linearly across a recording head at a very high rate of speed. However, it will be realized that to record approximately four million cycles per second, very high tape speeds are necessary. Even with the speed of the tape as high as 100 linear feet per second, it has been found that the image reproduced from such a record is far from being a clear and acceptable reproduction of the original picture.

I have found that it is possible to greatly reduce the speed of the tape by recording in a series of generally transverse or angularly positioned paths across the width of the tape, and by using this method, it is possible to use a tape speed of approximately 22½ inches per second, using tape approximately ½ inch wide, and I can reduce the linear tape speed even further if wider tape is used.

It is therefore a major object of my invention to provide a method and apparatus for magnetically recording and reproducing signals of very high frequency, such as television signals.

Another object of my invention is to provide such a method and apparatus that makes full use of the magnetic area of the tape, so that the linear speed of the tape is kept within practical limits.

It is a further object of my invention to provide a method of recording such signals that is both practical and does not require excessive amplification of the signals, nor a great deal of expensive equipment in order to practice it.

Another object of my invention is to provide means and apparatus for practicing the above-mentioned method, which means and apparatus are simple in construction and operation, and of comparatively low cost.

It is a still further object of my invention to provide both methods and apparatus for producing different types of magnetization upon the tape so that a choice of systems is available, and the system best adapted to the requirements may be selected.

These and other objects and advantages of my invention will become apparent from the following description of various forms thereof, in which.

Considering first the general aspects of my invention, it contemplates the use of a magnetic tape of appreciable width, such as ½ inch, one inch, etc., and the magnetizable area of this tape is magnetized in a series of parallel strips, each strip being at an angle to the longitudinal axis of the tape. By making the width of each strip relatively small, a large number of strips, such as, for example, 500, may be placed along each unit length of the tape, and a large amount of information can be recorded in a short length of tape. As a result, it is possible to reduce the tape speed to practical values.

To form the parallel strips, I provide a series of magnetic recording members around the periphery of a wheel or disc, and move the tape, in a direction generally parallel to the plane of rotation of disc, across the edge of the disc. As a result, each individual magnetic recording member sweeps across or scans the tape from one side to the other, and as one recording member leaves the magnetizable area of the tape, another recording member enters onto that area from the other side of the tape. In the meantime, due to the constant longitudinal movement of the tape, the second recording member traces a path slightly displaced, along the longitudinal length of the tape, but parallel to the first path so that a series of parallel paths are provided, the combined length of the individual paths being many times the length of the tape on which they are recorded. In some of its broader aspects, my present invention has certain features of similarity with two of my earlier patents, No. 2,003,680, issued June 4, 1935, and entitled "Television Receiving and Projecting Means and Methods," and No.

2,026,872, issued January 7, 1936, and entitled "Television Receiving Method and Apparatus."

Figure 1:
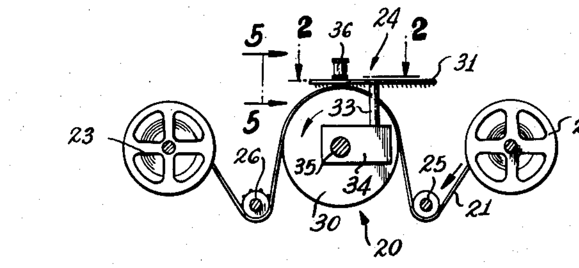
Figure 1 is a side elevational view of a simple form of apparatus intended to be used in the practice of my invention.
Figure 2:
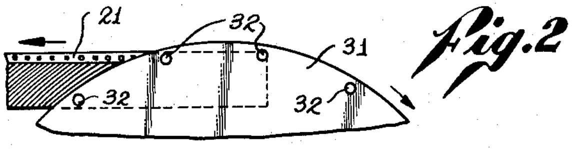
Figure 2 is a plan view of a portion of the apparatus shown in Figure 1, and taken in the direction 2—2 of that figure.
Figure 3:
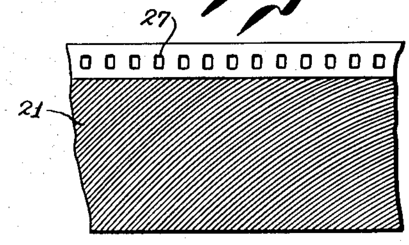
Figure 3 is a plan view of a section of magnetic tape indicating the position and arrangement of the normally invisible magnetic scans or paths formed on the tape.
Figure 4:
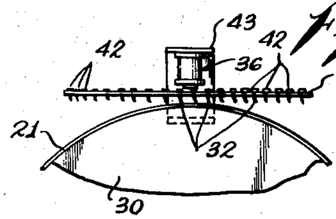
Figure 4 is a fragmentary view, to an enlarged scale, of the recording head and disc indicated in Figure 1.
Figure 5:
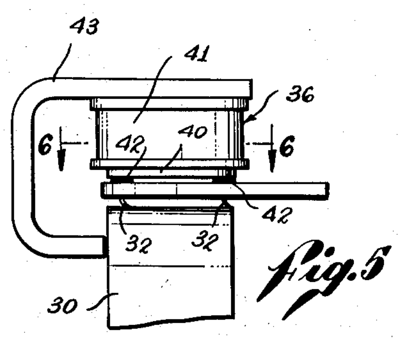
Figure 5 is a further enlarged fragmentary view taken on the line 5—5 of Figure 1.

Referring now to the drawings and particularly to Figures 1 through 7 thereof, the numeral 20 indicates generally my improved picture recording system, including a magnetic tape 21 stored upon a supply reel 22, a take-up reel 23, and a recording and reproducing apparatus 24. In its passage from the supply reel 22 to the take-up reel 23, the tape 21 passes over first and second idler rollers or sprockets 25 and 26, respectively, of which the second is preferably a driving sprocket. The tape 21 is preferably perforated along one or both edges, as indicated in Figure 3, the perforations 27 being arranged so that they may be engaged by the teeth of the sprocket 26 to impart a uniform movement to the tape.

Between the idler rollers and sprockets 25 and 26 is a rotating drum 30 over which the tape passes, the drum having a sufficient diameter so that it presents a substantially flat surface over a limited arc on its circumference. Above the drum 30 and generally perpendicular thereto, is a rotating disc 31 whose axis of rotation is displaced from a parallel diameter of the drum 30. The disc 31 is formed of a non-magnetic material such as brass, aluminum, or a suitable plastic, and around the periphery of the disc 31 I mount a series of pins or styli 32 that project through the disc in a direction generally parallel to the axis thereof, the lower ends of the styli being pointed and positioned to bear lightly against the surface of the tape 21 passing over the drum 30. The disc 31 turns at a relatively high speed, and is mounted upon a shaft 33 that may be connected by suitable means such as a gear box 34 to a shaft 35 upon which the rotating drum 30 is mounted. The speed of the disc 31 is thus related to the linear speed of the tape 21, and as hereinafter will become apparent, it is not essential that the disc 31 be connected to the drum 30, but may be connected to the driving sprocket 26 if this is preferable.

Considering the case where a television program conforming to the American standards is to be recorded, I prefer to relate the speeds of the tape 21 and the styli 32 so that approximately 500 styli traverse the tape while the latter advances a distance determined to be equal to one complete frame of the television picture, all of this occurring in the time required for one frame, i. e., $\frac{1}{30}$ of a second. For example, if the useful width of the tape 21 is ½ inch, and successive styli are located ½ inch apart, 125 styli spaced uniformly about the disc will form a circle approximately 62½ inches in circumference, or approximately 19.9 inches in diameter. If the disc 31 is rotated at the rate of 4 revolutions per frame, 500 styli will traverse the tape per frame, and the disc will rotate at the speed at 120 revolutions per second, or 7200 revolutions per minute. If the tape 21 is twice as wide, or has an effective width of one inch, for example, the spacing between the styli will be doubled, and the disc speed may be one-half the previous speed, or 3600 revolutions per minute, or the disc speed may remain fixed and the tape speed itself reduced.

Figure 7:
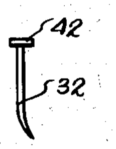
Figure 7 is a side elevational view of one of the needles or styli used in the operation of my device.

At a speed of 7200 revolutions per minute, a disc 20 inches in diameter becomes very rigid because of centrifugal force, so that if its surfaces are perfectly plane and the disc is perfectly balanced dynamically, the heads and points of the styli travel in perfect planes. Consequently, if the points of the styli 32 are once ground to an exact length, they will travel across the face of the tape 21 at a very uniform separation or pressure. To reduce the reluctance of the magnetic path, I prefer to have the points of the styli 32 in light but continuous contact with the tape 21, and consequently I point or reduce the end of each stylus, and preferably curve it, as indicated in Figure 7, so that a certain resilience is imparted to the point and the magnetic coating material on the tape 21 is not scratched from the surface thereof.

Figure 6:
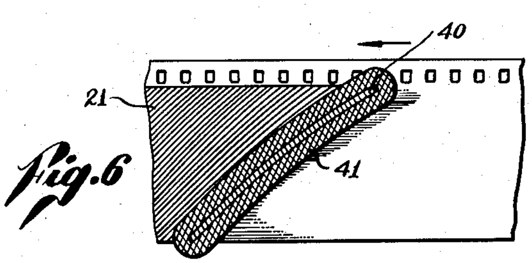
Figure 6 is a plan view, partially in section, taken on the line 6—6 of Figure 5 and showing the shape of the magnetic core.

To provide the magnetic energy necessary to cause the styli 32 to magnetize the coating upon the tape 21, I mount an electromagnet 36 above the upper surface of the disc 21, and spaced a slight distance therefrom. The electromagnet 36 is energized by the television or similar signals to be recorded and the core 40 of the electromagnet and the coil 41 surrounding it are elongated, as indicated in Figure 6, to extend across the width of the tape 21, along the path traversed by the styli 32. The upper ends of the styli 32 are preferably enlarged to form heads 42, indicated in Figure 7, and these heads, flush with, or projecting slightly above the upper surface of the disc 31, pass beneath the core 40 of the electromagnet 36 and transmit the magnetic flux from the core to the magnetic coating on the tape 21. The rotating drum 30 is of magnetic material, and a yoke 43 extends from the upper end of the core 40, remote from the disc 31, to the side of the drum 30 to complete the magnetic circuit. At its lower end, the yoke 43 is spaced a very small distance from the side of the drum 30 thereby providing an air gap in the circuit, and the heads 42 of the styli 32 are likewise spaced a very small distance from the core 40, thereby providing a second air gap in the magnetic circuit.

As previously mentioned, at the normal operating speed of the disc 31, the latter becomes very siff and rigid, and it is thus possible to maintain the separation between the heads 42 of the styli 32, and the core 40 of the electromagnet 36, at a very small value, in the order of 0.005 inch or less. The gap between the lower end of the yoke 43 and the rotating drum 30 may similarly be maintained at corresponding values, and thus the attenuation of the magnetic field caused by these two air gaps may be kept to reasonable values.

The styli 32 are so spaced and located that as one stylus leaves the effective area of the tape 21, another stylus starts across that effective area from the opposite side thereof. There is thus no overlapping of recording, nor any gaps therein, and the entire effective area of the tape is used to the greatest advantage. As a result, the record produced upon the tape 21 may be considered as made up of a great number of individual short segments, laid down side-by-side on the face of the tape and extending across the width of the tape. To reproduce the signals, the same procedure is followed as outlined above, with the exception that the electromagnet 36, instead of acting to magnetize the tape, acts as a pick-up coil to receive the variations in magnetic signal strength recorded on the tape. Thus, the styli 32 pass over the tape 21 in the same paths as previously described, and cause variations in the magnetic circuit including the styli 32, the core 40, and yoke 43, and the rotating drum 30. These variations produce a slight amount of electrical energy in the coil 41 that is amplified and used in the customary manner, and the net effect is the same as though all the short sections of the paths or record were originally recorded one after the other, along the axis of the tape, and then picked up or reproduced by a single stylus traveling at a very high and impractical speed along the axis of the tape.

Figure 8:
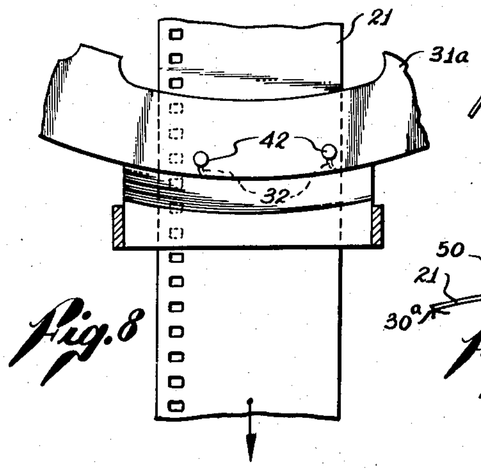
Figure 8 is a plan view, somewhat similar to Figure 2, of an alternate form of construction.

It will be recognized that the form of my device previously described produces a magnetic record in which one pole of the record is on the upper surface, while the other pole is on the opposite surface of the magnetic material. This form of recording, which may be termed "perpendicular magnetization," is different from that more commonly found on conventional tape recordings, the latter usually being of the so-called lateral or longitudinal type, where the opposite pole pieces are arranged laterally or longitudinally of the direction of movement of the tape. In Figure 8, I have shown an embodiment of my invention which makes use of the more common form of recording, which, for simplicity, I have termed "parallel magnetization," to distinguish it from the previously described perpendicular magnetization.

Figures 9, 10, 11:
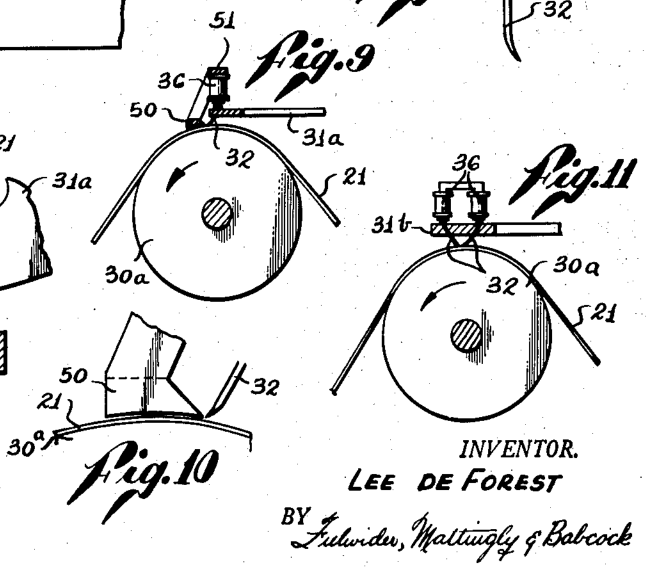
Figure 9 is a side elevational view, to a reduced scale, of the alternate form of my invention indicated in Figure 8.
Figure 10 is a further enlarged view of the magnetic shoe and needle used in the form of device shown in Figures 8 and 9.
Figure 11 is a side elevational view, generally similar to Figures 4 and 9, and illustrating still another form of my invention.

As indicated in Figure 9, a tape 21, similar in all respects to the previously described tape, is passed over a rotating drum 30a and beneath a rotating disc 31a having styli 32 located near its periphery. Where the previously described drum 30 was of magnetic material, to form a return path or circuit for the magnetic flux, the rotating drum 30a is of non-magnetic material, such as plastic, brass, aluminum, or other suitable material. The disc 31a is similar to the disc 31, but instead of having the styli 32 extending directly through the disc, in a direction generally parallel to the axis of rotation thereof, the styli may conveniently be directed somewhat outwardly so that the points are substantially aligned with the edge of the disc. If desired, the center of the disc 31a may be cut away to provide a rim in which the styli are mounted, the rim being held to the center and to the shaft 33 by means of spokes, indicated generally in Figure 8.

Immediately adjacent the path traced by the tips of the styli 32 is a plate or shoe 50 that is formed of magnetic material and spaced a very slight distance from the individual styli tips so that a magnetic gap is formed therebetween. An electromagnet 36, similar to that previously described, is located above the heads of the styli 32, and is provided with a yoke member 51 that extends from the upper end of the electromagnet to the shoe 50 to form a completed magnetic circuit. The magnetic circuit may thus be traced from the core 40 of the electromagnet 36 through the air gap to the heads of the styli 32, through the styli, and then through the gap between the points of the styli and the shoe 50, passing through the magnetic coating on the tape 21 during this passage. Thereafter, the flux returns through the yoke member 51 to the opposite end of the core of the electromagnet 36.

The edge of the shoe 50 adjacent the path of the tips of the styli 32 is preferably made quite thin, as indicated in Figure 10, thereby concentrating the magnetic flux and insuring that the major portion of it passes through the magnetic coating of the tape 21. Similarly, the edge of the shoe 50 is curved to correspond to the path of the tips of the styli 32 as clearly indicated in Figure 8. If desired, instead of having the styli 32 located at an angle, as indicated in Figures 9 and 10, the edge of the shoe may extend beneath the rim of the disc 31a so that the same spacing between the edge of the shoe and the styli is maintained.

With this form of apparatus, it will be seen that the magnetic flux passes from one pole, located on one side of the path or sweep, to another pole, located on the opposite side of the path. In other words, the magnetic flux travels from one side of the path to the other despite the fact that the tape is moving in a direction generally perpendicular to the movement of the styli.

As an alternate form of construction, instead of using the shoe 50, I may use two sets of styli, both mounted upon the disc 31, and both having their points adjacent each other, and bearing against the tape 21. Such a form is indicated in Figure 11 where it is seen that the tape 21 passes over a rotating drum 30a, similar to the non-magnetic drum just described, and a disc 31b, similar to the disc 31, rotates above the drum 30a. However, instead of having only one set of styli 32, the drum 31b is provided with two sets of styli, both sets consisting of the same number of styli, and each with the styli of one set being radially aligned with the styli of the other set, so that a pair of electromagnets 36a, corresponding to the electromagnet 36, simultaneously energize both the styli of a pair, and consequently magnetize the tape 21. The cores 40 of the electromagnets 36a are similar in shape to the core 40, previously described, being elongated to extend the length of the effective path of the styli 32, and the windings of the electromagnets 36a are similar to the previously described electromagnets, but may individually be of smaller size, since there are two of them. Alternatively, a single winding may be used, and the core 40 formed in the general shape of a C so that the same net result is obtained.

The tips of the styli 32, positioned immediately adjacent each other on the tape 21, form a magnetic gap through which the magnetic flux passes to magnetize the coating on the tape 21. It will be understood, of course, that the pairs of styli are spaced apart a sufficient distance, circumferentially, so that as one pair leaves the effective area of the tape 21, the next pair enters that area from the opposite side thereof. In this way, a continuous recording is insured.

As indicated in Figure 8, the styli 32 may trace a path that is essentially perpendicular to the longitudinal axis of the tape 21, or, by suitably spacing the styli and suitably locating the center of the disc 31, they may be caused to trace a path that is more at an angle to the longitudinal axis, as indicated generally in Figure 2. Either the substantially perpendicular or the more angular path may be used for any of the various forms of apparatus herein shown, and essentially it is a problem of design as to which of the various forms will be used. In any case, the tape 21, in its passage from the idler sprocket 25 to the rotating drum 30, will come in contact with styli moving in only one direction, as the return path of the styli, along the opposite edge of the disc 31, will be sufficiently spaced from the tape, and likewise sufficiently spaced from the electromagnet 36, to produce no magnetic effect upon the tape.

It will be realized that most of the features of present day magnetic recording may be used to good advantage with my herein described method and apparatus for recording television pictures. Particularly the use of the high frequency bias circuit and current, well known in the art for audio recording, is to be considered. This so-called bias circuit has the effect of aligning the various magnetic particles of the magnetic coating so that a better recording, with less background noise is obtained. While background signals do not make themselves known as noise in the recording of television programs, their effect is just as bad, and the use of such a high frequency bias current is of very great importance in this work.

While I have shown the various forms of my device as making use of a rotatable drum 30 over which the tape passes, this is not always necessary. In the recording of audio frequency signals upon a magnetic tape, for example, it is customary to move the tape over a polished metal plate, with the poles of the electromagnet bearing against the opposite face of the tape. In a similar manner, I may replace the drum 30 with a polished support of proper size, and press the tape 21 across this. The support should be quite hard to resist wear, and very smooth to reduce friction. In the form of my device illustrated in Figures 1 to 7, the support would be of ferromagnetic material, like the drum it replaces, while in the other forms, the support would be of non-magnetic material.

The previous description has been concerned primarily with the recording of television programs, but with the same equipment, a tape recorded in this manner can be reproduced in an obvious way. Thus, by passing the tape 21 from the supply reel to the take-up reel 23, and by rotating the disc 31 so that the styli 32 sweep over the same paths, a varying electrical current will be produced in the electromagnet 36, and this current may then be amplified in the conventional manner and used to provide the conventional television signal and picture.

While I have shown and described preferred and alternate forms of my invention, it will be apparent to those skilled in the art that many changes may be made therein without departing from the broad principles herein disclosed. Consequently, I do not wish to be restricted to the particular form or arrangement of parts or sequence of operations herein shown and described, except as limited by my claims.

I claim:

1. A device for recording or reproducing television or similar programs upon a magnetic tape, which includes: transport means for moving said tape at a substantially uniform speed along its longitudinal axis; a rotatable member mounted upon a shaft for rotation with respect to said tape; a plurality of magnetizable members mounted in said rotatable member and each having a tip adapted to sweep across said tape in a direction at an angle to said longitudinal axis thereof as said tape is being transported, whereby successive members trace parallel paths, one of said members starting its sweep as the preceding member finishes its sweep; and stationary electromagnet means positioned adjacent the heads of said magnetizable members as said members sweep across tape, whereby a signal is transferred between said electromagnet and said tape.

2. A device for recording or reproducing television or similar programs upon a magnetic tape, which includes: transport means for moving said tape at a substantially uniform speed along its longitudinal axis; a rotatable member mounted upon a shaft for rotation with respect to said tape; a plurality of magnetizable members mounted in said rotatable member and each having a tip adapted to sweep across said tape in a direction at an angle to said longitudinal axis thereof as said tape is being transported, whereby successive members trace parallel paths, one of said members starting its sweep as the preceding member finishes its sweep; and stationary electromagnet means positioned adjacent the heads of said magnetizable members as said members sweep across tape, whereby a signal is transferred between said electromagnet and said tape.

3. A device for recording or reproducing television or similar programs upon a magnetic tape, which includes: transport means for moving said tape at a substantially uniform speed along its longitudinal axis; a disc mounted for rotation in a plane substantially parallel to at least a portion of the travel of said tape, said disc turning at a speed determined by the longitudinal speed of said tape and at a constant ratio with respect thereto; a plurality of magnetizable members in the periphery of said disc and generally parallel to the axis of rotation thereof, each of said members having a tip adapted to bear lightly upon said tape and sweep across it in a direction at an angle to the longitudinal axis thereof as said tape is being transported, one of said members starting its sweep across said tape as the preceding member finishes its sweep, whereby successive members trace separate and parallel paths; and stationary electromagnet means positioned adjacent the heads of said magnetizable members as said members sweep across tape, each of said magnetizable members sequentially completing a magnetic circuit between said electro-magnet and said tape, whereby a signal is transferred between said electromagnet and said tape.

4. A device for recording or reproducing television or similar programs upon a magnetic tape, which includes: transport means for moving said tape at a substantially uniform speed along its longitudinal axis; a disc mounted for rotation in a plane substantially parallel to at least a portion of the travel of said tape, said disc turning at a speed determined by the longitudinal speed of said tape and at a constant ratio with respect thereto; a plurality of magnetizable members mounted in said rotatable member and each having a tip adapted to sweep across said tape in a direction at an angle to said longitudinal axis thereof as said tape is being transported, whereby successive members trace parallel paths, one of said members starting its sweep as the preceding member finishes its sweep; and stationary electromagnet means positioned on the side of said disc opposite said tape and spaced a slight distance from the heads of said magnetizable members, said electromagnet means being aligned with said parallel portion of said tape, over which said members sweep, and extending across said tape in the direction said members sweep and aligned with the path of said members, whereby magnetic signals are transmitted between said tape and said electromagnet means.

5. A device for recording or reproducing television or similar programs upon a magnetic tape, which includes: transport means for moving said tape at a substantially uniform speed along its longitudinal axis; a disc mounted for rotation in a plane substantially parallel to at least a portion of the travel of said tape, said disc turning at a speed determined by the longitudinal speed of said tape and at a constant ratio with respect thereto; a plurality of magnetizable members in the periphery of said disc and generally parallel to the axis of rotation thereof, each of said members having a tip adapted to bear lightly upon said tape and sweep across it in a direction at an angle to the longitudinal axis thereof as said tape is being transported, one of said members starting its sweep across said tape as the preceding member finishes its sweep, whereby successive members trace separate and parallel paths; and stationary electromagnet means positioned on the side of said disc opposite said tape and spaced a slight distance from the heads of said magnetizable members, said electromagnet means being aligned with said parallel portion of said tape, over which said members sweep, and extending across said tape in the direction said members sweep and aligned with the path of said members, said members thereby completing, in sequence, a magnetic circuit between said tape and said electromagnet means, whereby magnetic signals are transmitted between said tape and said electromagnet means.

6. A device for recording or reproducing television or similar programs upon a magnetic tape, which includes: transport means for moving said tape at a substantially uniform speed along its longitudinal axis; a rotatable drum adapted to receive and carry said tape around at least a portion of its periphery, at least the outer portion of said drum being of ferromagnetic material; a disc mounted for rotation in a plane substantially perpendicular to the plane of rotation of said drum, said disc turning at a speed that is a fixed ratio to the speed of rotation of said drum and hence to the longitudinal speed of said tape; a plurality of magnetizable members mounted around the periphery of said disc and each having a tip adapted to sweep across said tape upon the surface of said drum in a direction at an angle to said longitudinal axis of said tape as said tape is being transported, one of said members starting its sweep across said tape as the preceding member finishes its sweep, whereby successive members trace separate and parallel paths; stationary electromagnet means positioned adjacent the face of said disc opposite said drum and immediately adjacent, but not in contact with, the heads of said magnetizable members as said members sweep across said tape, said electromagnet means being aligned with the path of the heads of said members; and magnetic yoke means extending from said electromagnet means to said drum to complete a magnetic circuit from said electromagnet means, through said magnetizable members, said tape, said drum, and then through said yoke means to said electromagnet means.

7. A device for recording or reproducing television or similar programs upon a magnetic tape, which includes: transport means for moving said tape at a substantially uniform speed along its longitudinal axis; a rotatable drum adapted to receive and carry said tape around at least a portion of its periphery, at least the outer portion of said drum being a ferromagnetic material; a disc mounted for rotation in a plane substantially perpendicular to the plane of rotation of said drum, said disc turning at a speed that is a fixed ratio to the speed of rotation of said drum and hence to the longitudinal speed of said tape; a plurality of magnetizable members around the periphery of said disc and generally parallel to the axis of rotation thereof, each of said members having a tip adapted to bear lightly upon said tape and sweep cross it, in a direction at an angle to the longitudinal axis thereof, as said tape is being transported around the surface of said drum, one of said members starting its sweep across said tape as the preceding member finishes its sweep, whereby successive members trace separate and parallel paths; stationary electromagnet means positioned adjacent the face of said disc opposite said drum and immediately adjacent but spaced a slight distance from the heads of said magnetizable members, said electromagnet means being aligned with the portion of said tape passing over said drum and against which said magnetizable members bear, and extending across said tape in the direction said members sweep so that said members transmit magnetic signals between said tape and said electromagnet means when aligned with both, said electromagnetic means being aligned with the path of the heads of said members; and magnetic yoke means extending from said electromagnet means to said drum to complete a magnetic circuit from said electromagnet means, through said magnetizable members, said tape, said drum, and then through said yoke means to said electromagnet means.

8. A device for recording or reproducing television or similar programs upon a magnetic tape, which includes: transport means for moving said tape at a substantially uniform speed along its longitudinal axis; a rotatable drum adapted to receive and carry said tape around at least a portion of its periphery, at least the outer portion of said drum being of a nonmagnetic material; a disc mounted for rotation in a plane substantially perpendicular to the plane of rotation of said drum, said disc turning at a speed that is a fixed ratio to the speed of rotation of said drum and hence to the longitudinal speed of said tape; a plurality of magnetizable members mounted around the periphery of said disc and each having a tip adapted to sweep across said tape upon the surface of said drum in a direction at an angle to said longitudinal axis of said tape as said tape is being transported, one of said members starting its sweep across said tape as the preceding member finishes its sweep, whereby successive members trace separate and parallel paths; stationary electromagnet means positioned adjacent the face of said disc opposite said drum and immediately adjacent, but not in contact with, the heads of said magnetizable members as said members sweep across said tape, said electromagnetic means being aligned with the path of the heads of said members; a magnetic pole piece immediately adjacent the surface of said tape and adjacent the path of said magnetizable members to form a magnetic gap between said pole piece and each of said members as each of said members sweep across said tape, said pole piece remaining stationary as said drum and said disc rotate; and magnetic yoke means extending from said electromagnet means to said pole piece to complete a magnetic circuit from said electromagnet means, through said magnetizable members, said tape, said pole piece and then through said yoke means to said electromagnet means.

9. A device for recording or reproducing television or similar programs upon a magnetic tape, which includes: transport means for moving said tape at a substantially uniform speed along its longitudinal axis; a rotatable drum adapted to receive and carry said tape around at least a portion of its periphery, at least the outer portion of said drum being of a nonmagnetic material; a disc mounted for rotation in a plane substantially perpendicular to the plane of rotation of said drum, said disc turning at a speed that is a fixed ratio to the speed of rotation of said drum and hence to the longitudinal speed of said tape; a plurality of magnetizable members around the periphery of said disc and generally parallel to the axis of rotation thereof, each of said members having a tip adapted to bear lightly upon said tape and sweep across it, in a direction at an angle to the longitudinal axis thereof, as said tape is being transported around the surface of said drum, one of said members starting its sweep across said tape as the preceding member finishes its sweep, whereby successive members trace separate and parallel paths; stationary electromagnet means positioned adjacent the face of said disc opposite said drum and immediately adjacent but spaced a slight distance from the heads of said magnetizable members, said electromagnet means being aligned with the portion of said tape passing over said drum and against which said magnetizable members bear, and extending across said tape in the direction said members sweep and aligned with the path of the heads of said members so that said members transmit magnetic signals between said tape and said electromagnet means when aligned with both; a magnetic pole piece immediately adjacent the surface of said tape and adjacent the path of said magnetizable members to form a magnetic gap between said pole piece and each of said members as each of said members sweep across said tape, said pole piece remaining stationary as said drum and said disc rotate; and magnetic yoke means extending from said electromagnet means to said pole piece to complete a magnetic circuit from said electromagnet means, through said magnetizable members, said tape, said pole piece and then through said yoke means to said electromagnet means.

10. A device for recording or reproducing television or similar programs upon a magnetic tape, which includes: transport means for moving said tape at a substantially uniform speed along its longitudinal axis; a rotatable drum adapted to receive and carry said tape around at least a portion of its periphery, at least the outer portion of said drum being of a nonmagnetic material; a disc mounted for rotation in a plane substantially perpendicular to the plane of rotation of said drum, said disc turning at a speed that is a fixed ratio to the speed of rotation of said drum and hence to the longitudinal speed of said tape; a plurality of pairs of magnetizable members mounted in said disc, the members of each pair being radially aligned and spaced from each other, each of said members having a tip adapted to sweep across said tape upon the surface of said drum in a direction at an angle to said longitudinal axis of said tape as said tape is being transported, each pair of members being positioned so that the tips thereof are spaced a slight distance apart at said tape, one of said pairs of members starting its sweep across said tape as the preceding pair finishes its sweep, whereby successive pairs trace separate and parallel paths; and stationary electromagnet means positioned adjacent the face of said disc opposite said drum and immediately adjacent, but not in contact with, the heads of said pairs of magnetizable members as said pairs sweep across said tape.

11. A device for recording or reproducing television or similar programs upon a magnetic tape, which includes: transport means for moving said tape at a substantially uniform speed along its longitudinal axis; a rotatable drum adapted to receive and carry said tape around at least a portion of its periphery, at least the outer portion of said drum being of a nonmagnetic material; a disc mounted for rotation in a plane substantially perpendicular to the plane of rotation of said drum, said disc turning at a speed that is a fixed ratio to the speed of rotation of said drum and hence to the longitudinal speed of said tape; a plurality of pairs of magnetizable members in the periphery of said disc and generally parallel to the axis of rotation thereof, the members of each pair being radially aligned and spaced from each other with their tips radially spaced a slight distance apart to form a magnetic gap, the tips of each of said pairs being positioned to bear lightly upon said tape and sweep across it in a direction at an angle to the longitudinal axis thereof as said tape is being transported around the surface of said drum, one of said pairs starting its sweep across said tape as the preceding member finishes its sweep, whereby successive pairs trace separate and parallel paths; and stationary electromagnet means positioned adjacent the face of said disc opposite said drum and immediately adjacent but spaced a slight distance from the heads of said magnetizable members, the oposite poles of said electromagnet means being positioned to separately align with the separate magnetizable members of each of said pairs, said electromagnet means being aligned with the portion of said tape passing over said drum and against which said pairs of magnetizable members bear, and extending across said tape in the direction said members sweep so that said pairs of magnetizable members transmit magnet signals between said tape and said electromagnet means when aligned with both.

References Cited in the file of this patent

UNITED STATES PATENTS 2,245,286 Marzocchi ------------- June 10, 1941